United States Patent
Foreman et al.

(10) Patent No.: US 11,036,568 B1
(45) Date of Patent: Jun. 15, 2021

(54) ENABLING EXECUTION OF PROGRAM INSTRUCTIONS IN THE BACKGROUND

(71) Applicant: salesforce.com, inc., San Francisco, CA (US)

(72) Inventors: Jason Foreman, Saint Charles, IL (US); Wesley Peter, Sammamish, WA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 16/712,634

(22) Filed: Dec. 12, 2019

(51) Int. Cl.
*G06F 9/54* (2006.01)
*G06F 9/46* (2006.01)
*G06F 9/48* (2006.01)

(52) U.S. Cl.
CPC .............. *G06F 9/545* (2013.01); *G06F 9/461* (2013.01); *G06F 9/485* (2013.01); *G06F 9/541* (2013.01)

(58) Field of Classification Search
CPC .......... G06F 9/545; G06F 9/485; G06F 9/541; G06F 9/461
See application file for complete search history.

(56) References Cited

U.S. PATENT DOCUMENTS

| | | | |
|---|---|---|---|
| 2013/0332867 A1* | 12/2013 | Dunn ...................... | G06F 3/038 715/764 |
| 2015/0067705 A1* | 3/2015 | Oh .......................... | G06F 9/485 719/320 |
| 2016/0328271 A1* | 11/2016 | Gibbs ................... | G06F 9/5027 |
| 2017/0228263 A1 | 8/2017 | Seitz | |

OTHER PUBLICATIONS

Ori Harel, "How to run Javascript code in a background service on Android" (May 26, 2017), pp. 1-6 [retrieved from https://web.archive.org/web/20191112154441/https://medium.com/@oriharel/how-to-run-javascript-code-in-a-background-service-on-android-8ec1a12ebe92].*
Reto Meier, "Professional Android Application Development" (2009), Wiley Publishing Inc., pp. 1-399.*
Apple, "Downloading Files in the Background" (Jul. 10, 2018), pp. 1-5 [retrieved from https://web.archive.org/web/20180710204635/https://developer.apple.com/documentation/foundation/url_loading_system/downloading_files_in_the_background].*
Collins et al., "Android in Practice" (2012), Manning Publications Co., pp. 1-623.*

* cited by examiner

*Primary Examiner* — Brian W Wathen
(74) *Attorney, Agent, or Firm* — Kowert, Hood, Munyon, Rankin & Goetzel, P.C.

(57) ABSTRACT

Techniques are disclosed relating to the execution of a set of program instructions in the background. A parent environment of an application executing on a computer system may receive a request from a first child environment within the parent environment to execute a set of program instructions. The first child environment does not permit the set of program instructions to be executed within the first child environment while the application is backgrounded. In response to the request, the parent environment may spawn a second child environment within the parent environment that permits the set of program instructions to be executed while the application is backgrounded. The parent environment may cause the set of program instructions to be executed within the second child environment and may return a result of the executing to the first child environment.

16 Claims, 8 Drawing Sheets

ENABLING EXECUTION OF PROGRAM INSTRUCTIONS IN THE BACKGROUND

BACKGROUND

Technical Field

This disclosure relates generally to program execution, and more specifically, enabling the execution of program instructions in the background.

Description of the Related Art

Modern computer systems routinely execute multiple, different computer applications. For example, a computer system may execute a word processor, a web browser, and a mail application in such a manner that the applications appear, from the user's perspective, to be running simultaneously. Under this paradigm, a user can select which of several running applications is executing in the foreground, causing other applications to be executing in the background. For example, a user might have a web browser open that displays a web page on the screen of their mobile device. That user may switch from that web browser to a social media application, causing the web page to no longer be displayed on the screen. In this example, the social media application is running in the foreground, and the web page is running in the background.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "network interface configured to communicate over a network" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, in a processor having eight processing cores, the terms "first" and "second" processing cores can be used to refer to any two of the eight processing cores. In other words, the first and second processing cores are not limited to processing cores 0 and 1, for example.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION

As noted earlier, users may switch from one computer application to another computer application that is executing on their computer system. When a user switches from a computer application to another one, the former computer application is typically "backgrounded." As used herein, the term "backgrounded" broadly refers to a situation in which an application is moved from the "foreground" where a user directly interacts with it to the "background" where the user does not interact with the application. For example, when a user switches from a web browser to a social media application on their mobile device, the web browser is backgrounded such that it is not visible on the screen of the mobile device and the user is not interacting with the web browser. An application that has been backgrounded can be foregrounded if the user switches back to the application.

Computer applications often include program instructions that take an extended amount of time to completely execute. As an example, a computer application may include program instructions that download a large file when executed. Depending on various conditions, such as the speed of the connection, downloading that large file could take anywhere from minutes to hours.

In some implementations, these (relatively) long-latency program instructions are executed within an environment that does not continue to execute while it has been backgrounded. (As used herein, an "environment" refers to a set of facilities that is available to executing software—an operating system may be a facility that is part of an environment in many instances. The present disclosure discusses "parent" and "child" environments. The former thus provides facilities for software executing within this environment, including one or more child environments. A particular child environment in turn provides facilities for software executing in that particular environment, but not necessarily, for instance in a different child environment of the parent environment.) For example, the Android™ ecosystem provides a "WebView" environment that allows for web pages to be displayed as part of an "Activity" environment. The program instructions that are included in a web page—that is being rendered by the WebView environment—will cease to execute when the application that includes the WebView environment is backgrounded. As a result, program instructions that attempt to perform operations that take an extended amount of time will cease to execute unless the user keeps the application in the foreground (e.g., on their screen). This paradigm creates a poor user experience. The present disclosure addresses, for example, the technical problem of permitting the background execution of program instructions in the cases where an environment does not provide for that capability.

The present disclosure describes various techniques for enabling the execution of a set of program instructions in the background when it is not natively provided for. In various embodiments that are described below, a web application is executed within a first child environment. This child environment is contained in a parent environment that is implemented by a client application executing on a computer system. The web application may include a set of program instructions that perform a long-latency operation (e.g., downloading a large file). When executing within the first child environment, the set of program instructions (and the first child environment) cease to execute while the client application is backgrounded. In order to overcome this constraint on the first child environment, in various embodiments, the web application sends a request to the parent environment to execute the set of program instructions. The parent environment then spawns a second child environment in which the program instructions can continue to execute when the application has been backgrounded. Consequently, the parent environment causes the set of program instructions to be executed within the second child environment. The parent environment then returns a result of the executing back to the web application.

These techniques may be advantageous over prior approaches as these techniques allow for the execution of specific program code in the background. For example, a web application may include JavaScript® code that takes a relatively long time to completely execute or has to be executed periodically. In some cases, the web application may be executed in a WebView environment that is spawned within a mobile application (e.g., an Android™ application) so that the web content of the web application can be rendered for a user. But the WebView environment and the web application do not continue to execute in the background on a mobile device when the mobile application has been backgrounded. Using the techniques of the present disclosure, code such as JavaScript® code may be executed in a "JavaScriptCore" environment that enables the code to continue to execute even when the mobile application has been backgrounded. As a result, the user does not have to keep the mobile application active on the screen, creating a better user experience then prior approaches. An example system for implementing these techniques will now be discussed below, starting with reference to FIG. 1.

Figure 1:
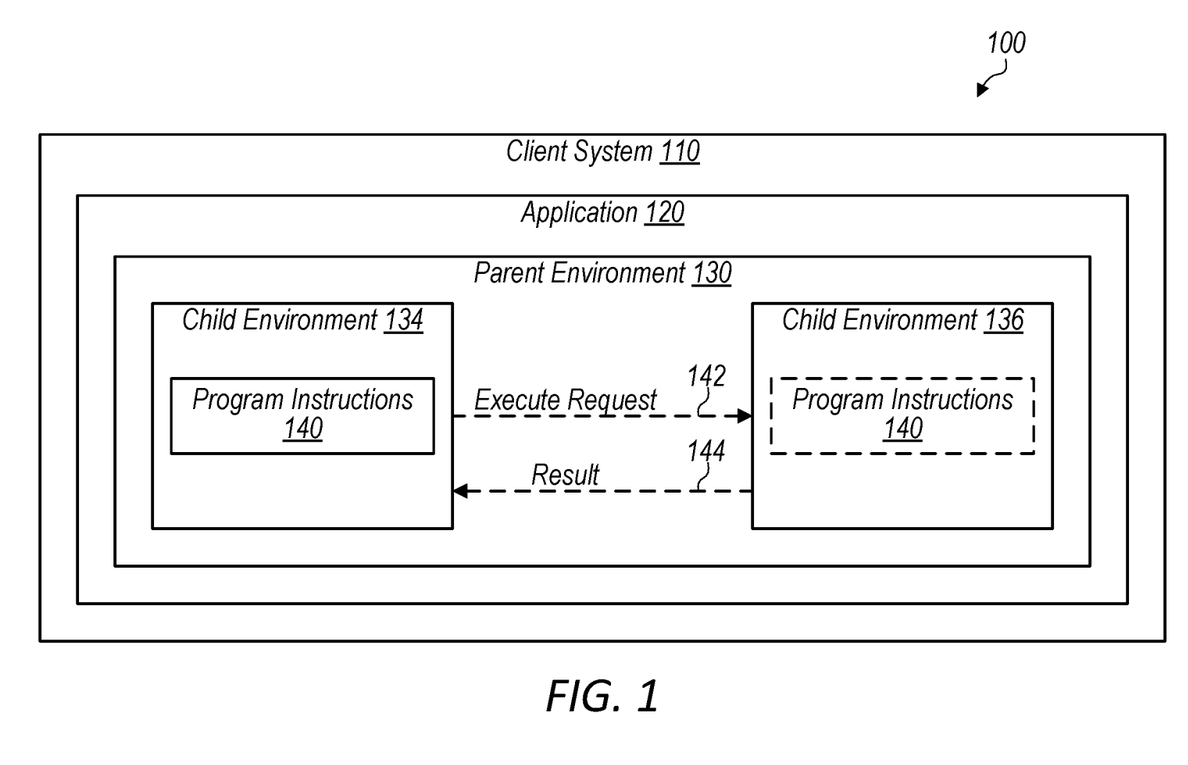
FIG. 1 is a block diagram illustrating example elements of a system capable of enabling the execution of program instructions in the background, according to some embodiments.

Turning now to FIG. 1, a block diagram of a system 100 is shown. System 100 includes a set of components that may be implemented via hardware or a combination of hardware and software routines. In the illustrated embodiment, system 100 includes a client system 110 that executes an application 120. As further shown, application 120 includes a parent environment 130 having a child environment 134 and another child environment 136. In some embodiments, system 100 may be implemented differently than shown. For example, system 100 may include a server system that communicates with client system 110 to provide program instructions 140 (e.g., by providing a web application that includes program instructions 140).

Client system 110, in various embodiments, is a computer system capable of facilitating the execution of applications 120. Client system 110 may be, for example, a desktop computer, a laptop, a smartphone, a tablet, a smartwatch, etc. In various embodiments, client system 110 implements a client platform upon which software routines, such as applications 120 and/or a web browser, may be executed. This client platform may be, for example, an operating system, such as iOS® or Android®. As such, in various embodiments, the client platform provides an environment that is capable of initiating execution of other software routines (e.g., application 120) and subsequent management of that execution (e.g., by scheduling computer processes of application 120).

The client platform may further provide a framework under which applications 120 are developed. In some cases, an application 120 developed for one client platform may implement the same or similar functionality as an application 120 developed for another client platform; however, both applications 120 may include different software routines. As an example, there may be an application 120 that is specific to the Android® operating system and an application 120 that is specific to the iOS® operating system. In various embodiments, the client platform provides an application store that allows for various applications such as application 120 to be downloaded and installed on the client platform of client system 110.

Figure 2:
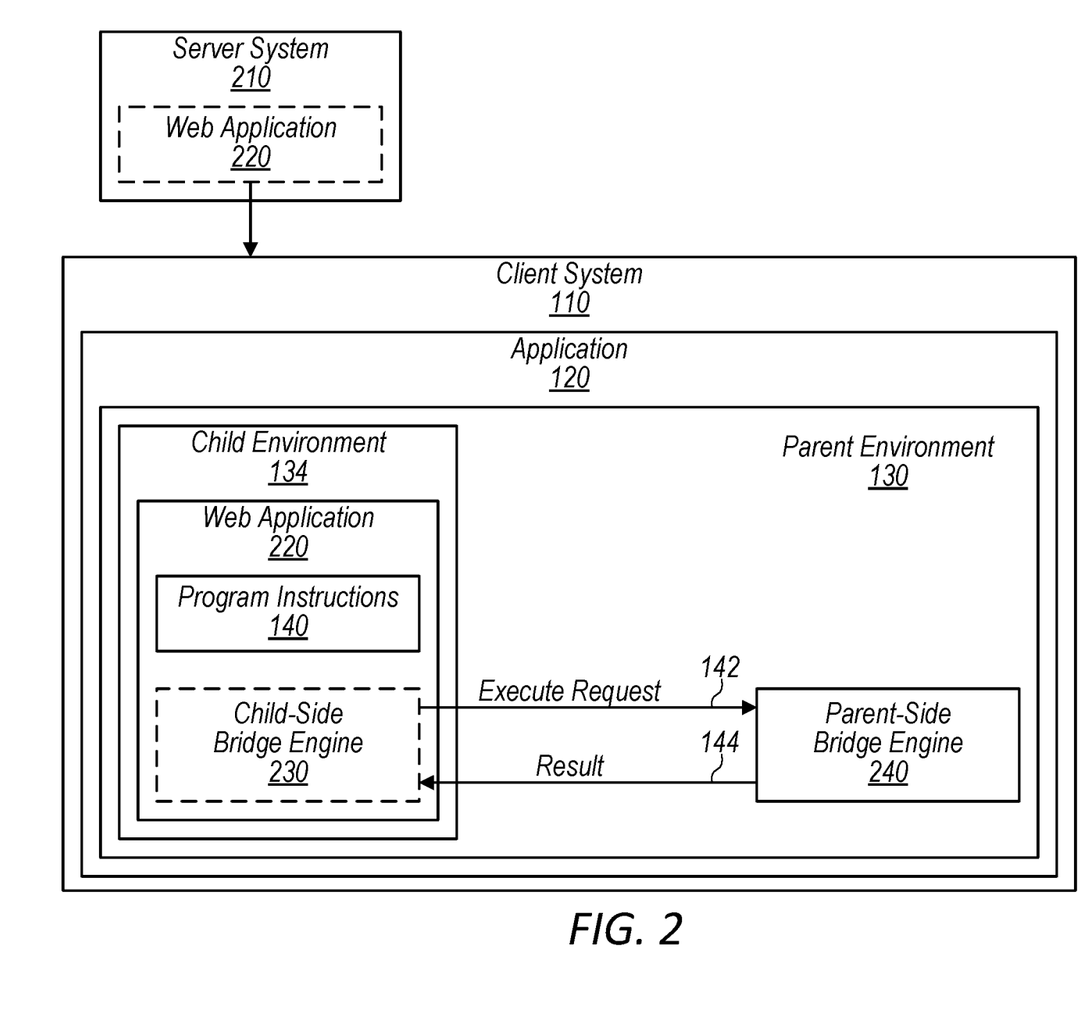
FIG. 2 is a block diagram illustrating example elements of a child environment that is capable of enabling a web application to be executed, according to some embodiments.

Application 120, in various embodiments, may be a set of software routines executable to render web-based content, such as a web application as discussed in more detail with respect to FIG. 2. In some cases, application 120 may be a native application that is native to the client platform of client system 110. The term "native application" is used herein in accordance with its ordinary and accustomed meaning in the art, and includes an application that is written for a framework (e.g., iOS® software development kits) supported by a specific client platform (e.g., iOS® platform). As an example, application 120 might be written and optimized for the iOS® operating system, and thus be "native" to that platform. In various embodiments, application 120 implements an application programming interface (API) (or supports an API of the client platform) that enables programs and environments spawned within application 120 to communicate with each other and with other programs running on the client platform, such as the operating system of client system 110. As depicted within the illustrated embodiment, application 120 implements parent environment 130, which may be a native environment of application 120.

Parent environment 130, in various embodiments, is a software environment in which software routines, such as child environment 134 and child environment 136, may be spawned and executed. Parent environment 130 may spawn child environments 134 and 136 in response to the occurrence of particular events. For example, parent environment 130 may receive, from a user or as part of initiating application 120, a request to access a certain web application from a remote server. After retrieving the web application, parent environment 130 may spawn child environment 134 and cause execution of that web application within that environment. In some cases, parent environment 130 may be requested to ensure the continued execution of particular program instructions (e.g., program instructions 140) even in the event that application 120 has been backgrounded. Continuing the previous example, the web application may include a set of program instructions 140 that may take an extended amount of time to execute and thus may be designated for continued execution even if application 120 has been backgrounded. In various embodiments, parent environment 130 spawns child environment 136 in order to execute that set of program instructions 140.

Child environment 134, in various embodiments, is a software environment that allows for web-based content to be executed and rendered to a user in some cases. Child environment 134 may be, for example, a WebView environment that allows for a web application (or just a web page) to be executed as part of a client application, such as application 120, that is native to a specific client platform. In the Android™ context for example, the WebView environment may be contained and executed within an Activity environment (parent environment 130) of an Android™ application. In various embodiments, child environment 134 and any processes within it (e.g., the execution of a web application) do not continue to execute when application 120 has been backgrounded (e.g., the operating system may not schedule processes associated with child environment 134 for execution while application 120 is backgrounded). As a result, program instructions 140 cease to execute while application 120 is backgrounded if they are executing within child environment 134.

In various embodiments, child environment 134 issues an execute request 142 to parent environment 130 to cause execution of particular program instructions 140. In response to the request, parent environment 130 may spawn child environment 136. Parent environment 130 may then cause execution of the particular program instructions 140 within child environment 136 and return a result 144 of the execution back to child environment 134.

Child environment 136, in various embodiments, is a software environment that allows for specific web-based content to be executed even while application 120 is backgrounded. For example, child environment 136 may be a "JavaScriptCore" environment that is capable of executing JavaScript® code even while application 120 is backgrounded. In various cases, when causing child environment 136 to be spawned, parent environment 130 instructs the operating system to continue to cause child environment 136 and any processes within it (e.g., the execution of program instructions 140) to continue to execute in the background. This paradigm allows a user of client system 110 to background application 120 (e.g., by switching to another application) without interrupting or stalling the execution of program instructions 140.

In one example implementation, a developer may create a web application that gathers information about a user's workouts and presents a graphical display of that information to the user on their device. The web application may be able to track the location of the user via their device as the user runs along a path. In various cases, the user may initially open an application 120 on their client system 110. Application 120 may retrieve the web application from a remote server and initiate execution of the web application within a child environment 134, such as a webview environment that allows for the information about the user's workouts to be presented to the user. But the web application is not able to execute within child environment 134 while application 120 is backgrounded (e.g., the user is viewing another application on their device). As a result, the web application would not be able to track the location of the user as the user runs if the user has another application in the foreground (e.g., a music application). In various cases, a portion of the web application that is associated with tracking the user is sent outside of child environment 134 and executed within a child environment 136 that allows for that portion to continue to execute even in the event that application 120 is backgrounded. Thus, the web application can continue to track the location of the user even when the user has another application open in the foreground.

Turning now to FIG. 2, a block diagram of an example child environment 134 is shown. In the illustrated embodiment, client system 110 executes application 120 that implements parent environment 130. As depicted, parent environment 130 includes child environment 134 and a parent-side bridge engine 240. Child environment 136 is not illustrated in the illustrated embodiment in order to simply the block diagram. As further depicted, child environment 134 includes a web application 220 having program instructions 140 and a child-side bridge engine 230. Also as depicted, client system 110 interacts with a server system 210 that includes web application 220. In some embodiments, client system 110 may be implemented differently than shown. For example, child-side bridge engine 230 may execute within child environment 134, but may not be included in web application 220.

Server system 210, in various embodiments, is a computer system capable of hosting web applications 220 for distribution to other computer systems including client system 110. Server system 210 may, for example, implement a database management system that is capable of interacting with tenants, applications (such as web application 220), and databases in order to store, analyze, and serve data. Accordingly, in various embodiments, server system 210 is a multi-tenant system that receives and manages data from tenants—that data may include web applications 220. Tenants of server system 210 may develop and upload web applications 220 to server system 210 for distribution to web browsers and application 120. Accordingly, server system 210 may host multiple web applications 220 that are received from one or more tenants and may send such web applications to web browsers and application 120 upon request.

Web application 220, in various embodiments, includes a set of software routines that are executable to provide a web-based experience. Web application 220 may be, for example, a set of dynamic web pages that a user can view and interact with when rendered by application 120 via child environment 134. As shown, web application 220 originates from server system 210; in various embodiments, application 120 may access different web applications 220 from different, separate server systems 210 and render each of them via a child environment 134. In some embodiments, web application 220 includes or references program instructions 140 (e.g., via a uniform resource locator (URL) that points to a remote server system, such as server system 210). Program instructions 140 may be executable to implement various functions such as downloading a large file, periodically gathering health metrics (e.g., from a watch worn by a user), etc. In some cases, it may be desirable to allow for program instructions 140 to execute when application 120 has been backgrounded. As such, web application 220 utilizes child-side bridge engine 230 to cause program instructions to be executed within child environment 136.

Child-side bridge engine 230, in various embodiments, is a set of software routines that are executable to communicate with parent-side bridge engine 240 in order to cause program instructions 140 to be executed in a child environment 136. In some embodiments, child-side bridge engine 230 is a software library that a developer incorporates into their web application 220 when developing that web application. In yet some embodiments, child-side bridge engine 230 is a standalone application with which web application 220 may interface. As such, when child environment 134 is spawned, parent environment 130 may cause child-side bridge engine 230 to execute within child environment 134 so that web application 220 might interface with it. In various embodiments, web application 220 registers program instructions 140 with child-side bridge engine 230 to enable child-side bridge engine 230 to provide program instructions 140 to parent-side bridge engine 240. In some cases, web application 220 may provide child-side bridge engine 230 with a reference to program instructions 140 (e.g., a URL). In yet some cases, web application 220 may identify a block of code of web application 220 that includes program instructions 140.

When invoking program instructions 140, in some embodiments, web application 220 instructs child-side bridge engine 230 to cause execution of program instructions 140. Child-side bridge engine 230 issues an execute request 142 to parent-side bridge engine 240 to cause execution of program instructions 140. In some embodiments, child-side bridge engine 230 communicates with parent-side bridge engine 240 (e.g., in order to issue an execute request 142) using APIs supported by the client platform of client system 110. For example, child-side bridge engine 230 may utilize a software development kit (SDK) API supported by iOS® that permits communication between child environment 134 and parent environment 130. Execute request 142, in various embodiments, identifies program instructions 140 to parent-side bridge engine 240. In some cases, execute request 142 may include program instructions 140; in some cases, execute request 142 may include a reference to program instructions 140 (e.g., a URL to a location on a remote server that stores program instructions 140).

Parent-side bridge engine 240, in various embodiments, is a set of software routines executable to spawn a child environment 136 and cause execution of program instructions 140 within that child environment. As noted, parent-side bridge engine 240 may receive an execute request 142 from child-side bridge engine 230 to execute program instructions 140. In response to execute request 142 specifying a reference to program instructions 140, parent-side bridge engine 240 may retrieve program instructions 140 from the location identified by the reference (e.g., a location identified by a URL). In various embodiments, parent-side bridge engine 240 spawns child environment 136 to execute program instructions 140 as discussed in more detail with respect to FIG. 3.

Figure 3:
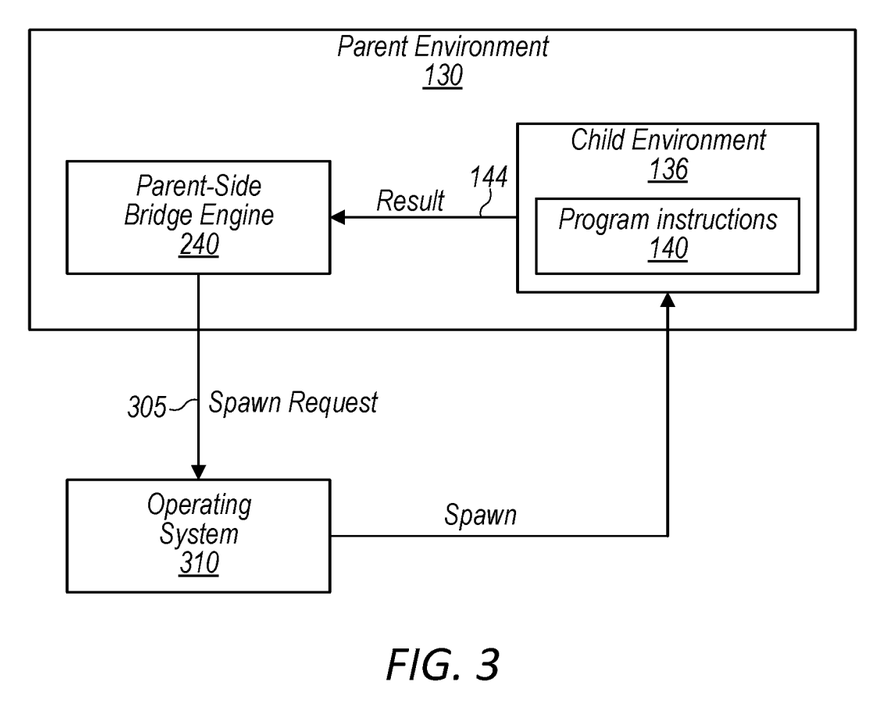
FIG. 3 is a block diagram illustrating example elements of a child environment that is capable of enabling program instructions to be executed while a client application that includes the child environment is backgrounded, according to some embodiments.

Turning now to FIG. 3, a block diagram of an example child environment 136 is shown. In the illustrated embodiment, parent environment 130 includes child environment 136 and parent-side bridge engine 240. As shown, parent-side bridge engine 240 communicates with an operation system 310. Child environment 134 is not illustrated in the illustrated embodiment in order to simply the block diagram. In some embodiments, parent environment 130 may be implemented differently than shown. For example, child environment 136 may include a child-side bridge engine that may communicate with parent-side bridge engine 240—e.g., to send result 144 from child environment 136 to parent environment 130.

As explained previously, parent-side bridge engine 240 may receive an execute request 142 from child-side bridge engine 230 to execute a set of program instructions 140. In response to execute request 142, parent-side bridge engine 240 may spawn child environment 136. In order to spawn child environment 136, in various embodiments, parent-side bridge engine 240 transmits a spawn request 305 to operating system 310.

Operating system 310, in various embodiments, is a set of software routines executable to manage computer hardware and software resources and to provide various services to other software routines (e.g., parent environment 130, web application 220, etc.). Operating system 310 may receive a spawn request 305 that identifies a set of software routines to be executed by client system 110. In various cases, spawn request 305 may identify software routines that correspond to child environment 136. For example, spawn request 305 may identify a location in memory at which to begin execution. As such, operating system 310 may schedule a process for execution that corresponds to that location in memory. In some cases, spawn request 305 may instruct operating system 310 to allow for child environment 136 (and any sub-processes of child environment 136) to continue to be executed even in the event that application 120 is backgrounded. Accordingly, in various embodiments, operating system 310 may continually schedule child environment 136 for execution even when application 120 is backgrounded, but not schedule child environment 134 for execution while application 120 is backgrounded.

As discussed, child environment 136 allows for program instructions 140 to be executed while application 120 is backgrounded. In various embodiments, child environment 136 causes program instructions 140 (which may be received from child environment 134) to be executed. For example, child environment 136 may be a JavaScript-based environment that allows for JavaScript® code to be executed within that environment. Child environment 136 returns a result 144 of the execution of program instructions 140 to child environment 134 via parent-side bridge engine 240. For example, program instructions 140 may be executable to cause client system 110 to track a user's heart rate. Accordingly, result 144 may include the user's current heart rate.

In some embodiments, in response to program instructions 140 completing execution, parent environment 130 causes deallocation of child environment 136 (e.g., by communicating with operating system 310). In some cases, parent environment 130 may be instructed by child environment 134 to cause program instructions 140 to be executed periodically (e.g., every 10 minutes). Accordingly, parent environment 130 may cause another child environment 136 to be spawned in order to execute program instructions 140 again.

Figure 4:
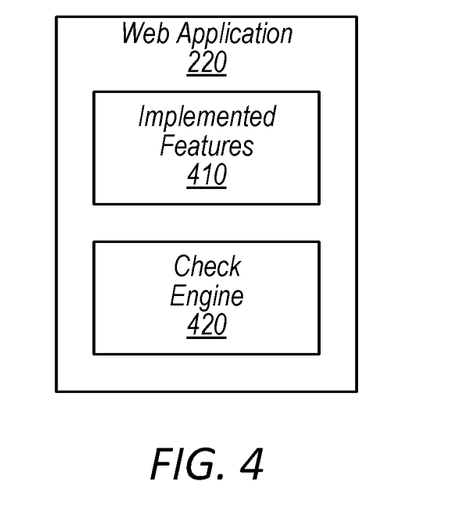
FIG. 4 are block diagrams illustrating example elements of a web application executable within a client application, according to some embodiments.

Turning now to FIG. 4, a block diagram of an example web application 220 is shown. In the illustrated embodiment, web application 220 includes implemented features 410 and a check engine 420. In some embodiments, web application 220 may be implemented differently than shown. For example, check engine 420 may be included in child-side bridge engine 230, which may be included in web application 220.

Implemented features 410, in various embodiments, are features that a web application 220 is capable of invoking when it is executed. Examples of implemented features 410 include, but are not limited to, camera access, microphone access, photo access, geofencing, artificial intelligence integration (e.g., the ability to issue commands to Siri®), Bluetooth® access, and push notifications. In some cases, one or more features 410 may be supported by a web browser and/or a client platform (e.g., iOS®). Accordingly, when executed within a web browser, web application 220 may invoke the features of implemented features 410 that are supported by the web browser. When executed within application 120, web application 220 may invoke features of implemented features 410 that are supported by the client platform on which the application is running. For example, if iOS® supports Bluetooth® access, then web application 220 may use Bluetooth®. Web application 220 may therefore invoke the appropriate features 410 based on the environment in which it is executed.

In various embodiments, implemented features 410 may include the ability to execute program instructions 140 in a child environment 136. But, in some cases, a web browser and/or a client platform may not support this feature 410. Consequently, in various embodiments, web application 220 includes a check engine 420. In some cases, check engine 420 may be included in child-side bridge engine 230 (e.g., if child-side bridge engine 230 is a part of web application 220).

Check engine 420, in various embodiments, checks for implemented features 410 that are available for invoking by web application 220 when executed. In some embodiments, check engine 420 initially determines the environment (e.g., a web browser, an iOS® application, an Android™ application, etc.) in which web application 220 is executing. As such, based on the environment, check engine 420 may determine whether a particular feature 410 is available for invoking by web application 220. For example, if web application 220 is being executed within a web browser, then check engine 420 may determine that Bluetooth® access is not available to web application 220. Check engine 420 may register the features 410 (via an API) that are available. After registering features 410, web application 220 may invoke those features (e.g., by making API calls to child-side bridge engine 230).

As noted, the ability to execute program instructions 140 within child environment 136 may be an implemented feature 410. Accordingly, check engine 420 may check to determine whether that feature is available via the environment in which application 220 is executing. If that feature is not available, then web application 220 may execute program instructions 140 within child environment 134. But if that feature is available, then web application 220 may cause program instructions 140 to be executed within child environment 136. Based on the environment in which web application 220 is executing, check engine 420 (and/or child-side bridge engine 230) may select between various APIs to communicate with parent environment 130. For example, if web application 220 is executing within an iOS-based application 120, then the iOS® SDK API may be used instead of the Android™ SDK API.

Figure 5:
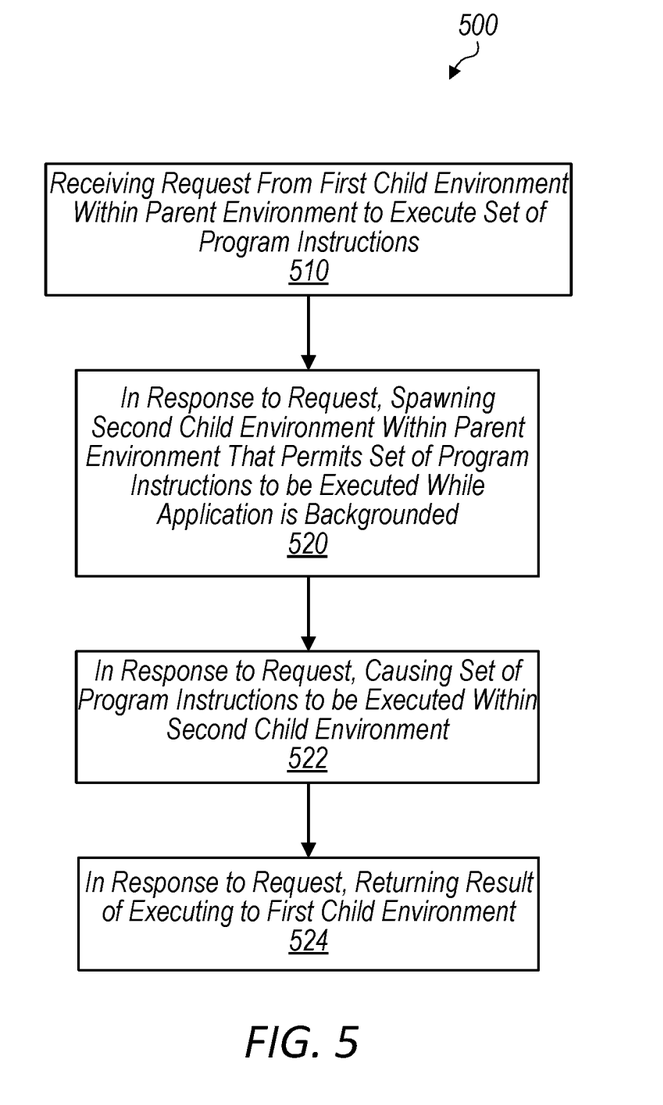
FIGS. 5-7 are flow diagrams illustrating example methods relating to executing a set of program instructions, according to some embodiments.

Turning now to FIG. 5, a flow diagram of a method 500 is shown. Method 500 is one embodiment of a method performed by a parent environment (e.g., parent environment 130) of an application (e.g., application 120) executing on a computer system (e.g., client system 110) to enable a set of program instructions (e.g., program instructions 140) to be executed in the background (e.g., when the application is backgrounded). Method 500 may be performed in response to the initiation of the application. In some embodiments, method 500 may include additional steps than shown. For example, method 500 may include a step in which the parent environment receives a web application (e.g., web application 220) having the set of program instructions.

Method 500 begins in step 510 with the parent environment receiving a request (e.g., execute request 142) from a first child environment (e.g., child environment 134) within the parent environment to execute a set of program instructions. The parent environment may spawn the first child environment and cause a web application to be executed within the first child environment. In various instances, the web application may include the set of program instructions. The first child environment does not permit the set of program instructions to be executed within the first child environment while the application is backgrounded. As such, the web application may cause the request to be sent to the parent environment to execute the set of program instructions. In some cases, the set of program instructions may be included in a first application (e.g., a web application 220) that is executable to submit the set of program instructions to a second application (e.g. child-side bridge engine 230) that is executable, within the first child environment, to send the set of program instructions to the parent environment as part of the request.

In step 520, in response to the request, the parent environment spawns a second child environment (e.g., child environment 136) within the parent environment that permits the set of program instructions to be executed while the application is backgrounded. Spawning the second child environment may include the parent environment instructing an operating system (e.g., operating system 310) that is executing on the computer system to cause continued execution of the second child environment when the application is backgrounded.

In step 522, in further response to the request, the parent environment causes the set of program instructions to be executed within the second child environment. In some cases, the request may specify a uniform resource locator (URL) that corresponds to the set of program instructions. Accordingly, the parent environment may retrieve, based on the URL, the set of program instructions from a location external to the parent environment (e.g., server system 210). In some cases, the set of program instructions are sent from the first child environment to the parent environment as part of the request.

In step 524, in further response to the request, the parent environment returns a result (e.g., result 144) of the executing to the first child environment. In some cases, the result of the executing may be returned to the first child environment in response to the parent environment receiving a data request from the first child environment for data generated by execution of the set of program instructions.

In some cases, the received request (e.g., execute request 142) may specify that the set of program instructions are to be executed periodically. Accordingly, in some embodiments, the parent environment deallocates the second child environment in response to the set of program instructions completing execution. In response to determining to execute the set of program instructions again, the parent environment may spawn a third child environment (e.g., a child environment 136) within the parent environment that permits the set of program instructions to be executed while the application is backgrounded. The parent environment may cause the set of program instructions to be executed within the third child environment.

In some cases, the set of program instructions may include JavaScript program instructions. The first child environment may be a webview environment in which the JavaScript program instructions are not permitted to be executed while the application is backgrounded. The second child environment may be a JavaScript-based environment (e.g., a "JavaScriptCore" environment) in which the JavaScript program instructions are permitted to be executed while the application is backgrounded.

Figure 6:
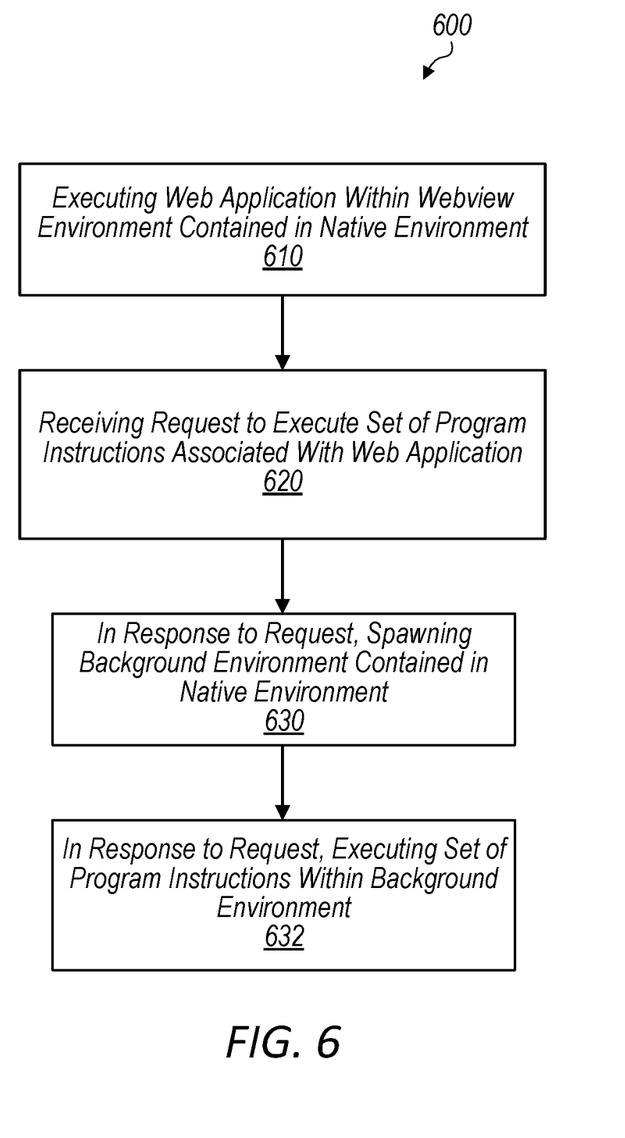

Turning now to FIG. 6, a flow diagram of a method 600 is shown. Method 600 is one embodiment of a method performed by a computer system (e.g., client system 110) in order to execute a set of program instructions (e.g., program instructions 140). The computer system may implement a native environment (e.g., parent environment 130) that performs the steps of method 600. Method 600 may be performed by executing a set of program instructions stored on a non-transitory computer-readable medium. In some embodiments, method 600 may include additional steps than shown. For example, method 600 may include a step in which the parent environment receives a web application (e.g., web application 220) having the set of program instructions.

Method 600 begins in step 610 with the native environment executing a web application within a webview environment (e.g., child environment 134) that is contained in the native environment. The webview environment does not permit program instructions to be executed within the webview environment while the native environment is backgrounded.

In step 620, the native environment receives a request (e.g., execute request 142) to execute a set of program instructions associated with the web application. The request may be received from a bridge application (e.g., child-side bridge engine 230) that is executing within the webview environment.

In step 630, in response to the request, the native environment spawns a background environment (e.g., child environment 136) that is contained in the native environment. The background environment may permit the set of program instructions to be executed while the native environment is backgrounded. In some cases, spawning the background environment may include instructing an operating system (e.g., operating system 310) that is executing on the computer system to spawn the background environment such that the background environment can execute while the native environment is backgrounded.

In step 632, in further response to the request, the native environment executes the set of program instructions within the background environment. The set of program instructions may have been passed from the webview environment to the native environment as part of the request. In some cases, the parent environment may retrieve the set of program instructions from a location external to the computer system based on a uniform resource locator (URL) specified by the request. In various embodiments, the parent environment returns a result (e.g., result 144) of executing the set of program instructions to the web application via the bridge application.

Figure 7:
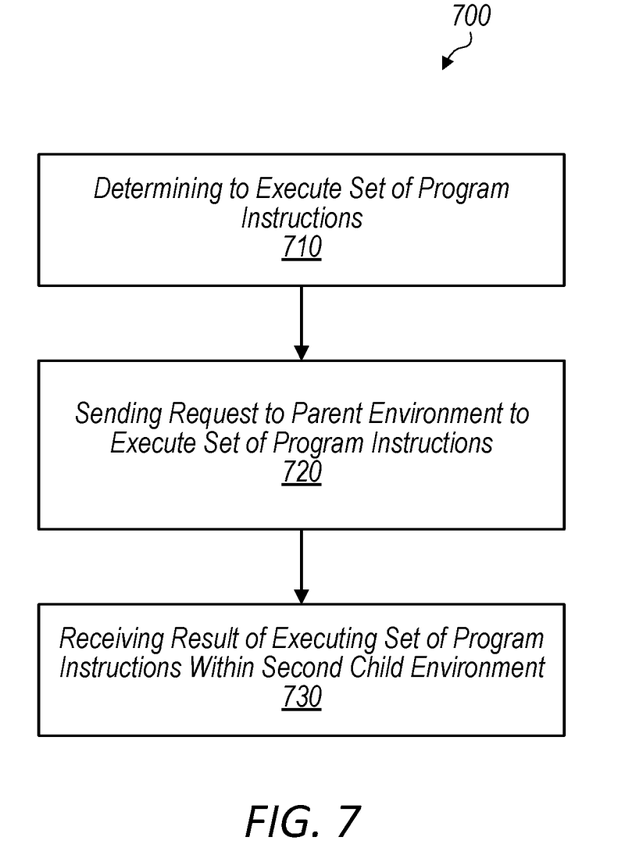

Turning now to FIG. 7, a flow diagram of a method 700 is shown. Method 700 is one embodiment of a method performed by a web application (e.g., web application 220) executing within a first child environment (e.g., child environment 134) that is contained in a parent environment (e.g., parent environment 130) of an application (e.g., application 120) executing on a computer system (e.g., client system 110) in order to execute a set of program instructions (e.g., program instructions 140). Method 700 may be performed by executing a set of program instructions stored on a non-transitory computer-readable medium. In some embodiments, method 700 may include additional steps than shown. For example, method 700 may include a step in which the web application communicates with another application (e.g., child-side bridge engine 230) executing within the first child environment to transmit the set of program instructions from the web application to the parent environment via the other application.

Method 700 begins in step 710 with the web application determining to execute a set of program instructions. In various cases, the set of program instructions are not be executed within the first child environment while the application is backgrounded. In some cases, the web application may determine whether the set of program instructions can be provided to the parent environment for execution within the second child environment. For example, the web application may assess the platform (e.g., iOS®) to determine if the platform provides an API for communicating with the parent environment and whether the parent environment is able to spawn a second child environment (e.g., child environment 136). The web application may cause execution of the set of program instructions within the first child environment in response to determining that the set of program instructions cannot be provided to the parent environment for execution within the second child environment.

In step 720, the web application sends a request (e.g., execute request 142) to the parent environment to execute the set of program instructions. The parent environment may be capable of spawning a second child environment in which the set of program instructions can execute while the application is backgrounded. The web application may select a particular one of a plurality of application program interfaces (APIs) (e.g., iOS® API, Android® API, web browser API, etc.) for communicating with the parent environment. The particular API may be selected based on an operating system executing on the computer system. In various cases, the request to execute the set of program instructions may specify a location at which the set of program instructions are stored and the location may be external to the computer system.

In step 730, the web application receives, from the parent environment, a result (e.g., result 144) of executing the set of program instructions within the second child environment.

Exemplary Computer System

Figure 8:
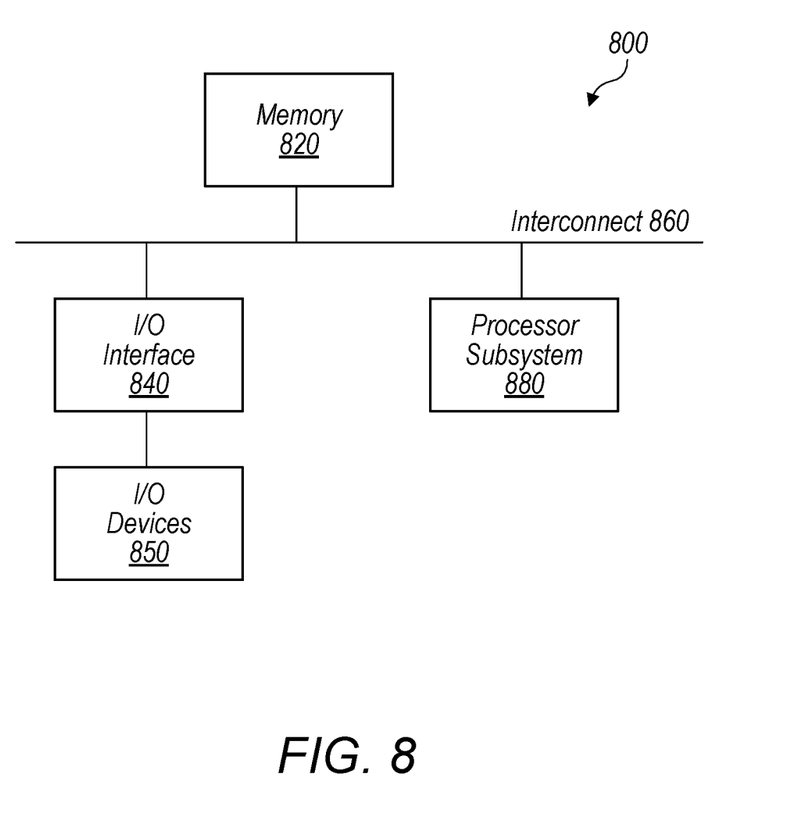
FIG. 8 is a block diagram illustrating an example computer system, according to some embodiments.

Turning now to FIG. 8, a block diagram of an exemplary computer system 800, which may implement client system 110 and/or server system 210, is depicted. Computer system 800 includes a processor subsystem 880 that is coupled to a system memory 820 and I/O interfaces(s) 840 via an interconnect 860 (e.g., a system bus). I/O interface(s) 840 is coupled to one or more I/O devices 850. Computer system 800 may be any of various types of devices, including, but not limited to, a server system, personal computer system, desktop computer, laptop or notebook computer, mainframe computer system, tablet computer, handheld computer, workstation, network computer, a consumer device such as a mobile phone, music player, or personal data assistant (PDA). Although a single computer system 800 is shown in FIG. 8 for convenience, system 800 may also be implemented as two or more computer systems operating together.

Processor subsystem 880 may include one or more processors or processing units. In various embodiments of computer system 800, multiple instances of processor subsystem 880 may be coupled to interconnect 860. In various embodiments, processor subsystem 880 (or each processor unit within 880) may contain a cache or other form of on-board memory.

System memory 820 is usable store program instructions executable by processor subsystem 880 to cause system 800 perform various operations described herein. System memory 820 may be implemented using different physical memory media, such as hard disk storage, floppy disk storage, removable disk storage, flash memory, random access memory (RAM—SRAM, EDO RAM, SDRAM, DDR SDRAM, RAMBUS RAM, etc.), read only memory (PROM, EEPROM, etc.), and so on. Memory in computer system 800 is not limited to primary storage such as memory 820. Rather, computer system 800 may also include other forms of storage such as cache memory in processor subsystem 880 and secondary storage on I/O Devices 850 (e.g., a hard drive, storage array, etc.). In some embodiments, these other forms of storage may also store program instructions executable by processor subsystem 880. In some embodiments, program instructions that when executed implement application 120, parent environment 130, child environments 134 and 136, web application 220, child-side bridge engine 230, parent-side bridge engine 240, and operating system 310 may be included/stored within system memory 820.

I/O interfaces 840 may be any of various types of interfaces configured to couple to and communicate with other devices, according to various embodiments. In one embodiment, I/O interface 840 is a bridge chip (e.g., Southbridge) from a front-side to one or more back-side buses. I/O interfaces 840 may be coupled to one or more I/O devices 850 via one or more corresponding buses or other interfaces. Examples of I/O devices 850 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 800 is coupled to a network via a network interface device 850 (e.g., configured to communicate over WiFi, Bluetooth, Ethernet, etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
   causing, by a parent environment of an application executing on a computer system, a web application to be executed within a first child environment within the parent environment, wherein the web application includes a particular set of program instructions;
   receiving, by the parent environment, a request from the first child environment to execute the particular set of program instructions, wherein the first child environment does not permit the particular set of program instructions to be executed within the first child environment while the application is backgrounded, and wherein the request includes the particular set of program instructions; and
   in response to the request, the parent environment:
      spawning a second child environment within the parent environment that permits the particular set of program instructions to be executed while the application is backgrounded;
      causing the particular set of program instructions to be executed within the second child environment; and
      returning a result of the executing to the first child environment.

2. The method of claim 1, further comprising:
   receiving, by the parent environment, the web application that includes the particular set of program instructions; and
   spawning, by the parent environment, the first child environment.

3. The method of claim 1, wherein spawning the second child environment includes:
   instructing, by the parent environment, an operating system executing on the computer system to cause continued execution of the second child environment when the application is backgrounded.

4. The method of claim 1, wherein the web application is executable to submit the particular set of program instructions to another application that is executable, within the first child environment, to send the particular set of program instructions to the parent environment as part of the request.

5. The method of claim 1, wherein the result of the executing is returned to the first child environment in response to the parent environment receiving a data request from the first child environment for data generated by execution of the particular set of program instructions.

6. The method of claim 1, wherein the received request specifies that the particular set of program instructions are to be executed periodically.

7. The method of claim 6, further comprising:
   deallocating, by the parent environment, the second child environment in response to the particular set of program instructions completing execution; and
   in response to determining to execute the particular set of program instructions again, the parent environment:

spawning a third child environment within the parent environment that permits the particular set of program instructions to be executed while the application is backgrounded; and causing the particular set of program instructions to be executed within the third child environment.

8. The method of claim 1, wherein the particular set of program instructions include JavaScript-based program instructions, wherein the first child environment is a webview environment in which the JavaScript-based program instructions are not permitted to be executed while the application is backgrounded, and wherein the second child environment is a JavaScript-based environment in which the JavaScript-based program instructions are permitted to be executed while the application is backgrounded.

9. A non-transitory computer readable medium having program instructions stored thereon that are capable of causing a computer system to implement a native environment that is capable of performing operations comprising:

executing a web application within a webview environment contained in the native environment, wherein the webview environment does not permit program instructions included in the web application to be executed within the webview environment while the native environment is backgrounded;

receiving a request to execute a set of program instructions the web application, wherein the request includes the set of program instructions; and in response to receiving the request:
spawning a background environment contained in the native environment, wherein the background environment permits the set of program instructions to be executed while the native environment is backgrounded; and executing the set of program instructions within the background environment.

10. The medium of claim 9, wherein the operations further comprise:

receiving the web application from a remote server system.

11. The medium of claim 9, wherein spawning the background environment includes:

instructing an operating system that is executing on the computer system to spawn the background environment such that the background environment can execute while the native environment is backgrounded.

12. The medium of claim 9, wherein the request is received from a bridge application that is executing within the webview environment, and wherein the operations further comprise:

returning a result of executing the set of program instructions to the web application via the bridge application.

13. A method, comprising:

determining, by a web application executing within a first child environment contained in a parent environment of an application that is executing on a computer system, to execute a set of program instructions, wherein the set of program instructions cannot be executed within the first child environment while the application is backgrounded;

sending, by the web application, a request to the parent environment to execute the set of program instructions, wherein the request includes the set of program instructions, and wherein the parent environment is capable of spawning a second child environment in which the set of program instructions can execute while the application is backgrounded; and receiving, by the web application from the parent environment, a result of executing the set of program instructions within the second child environment.

14. The method of claim 13, further comprising:

determining, by the web application, whether the set of program instructions can be provided to the parent environment for execution within the second child environment, wherein the web application is operable to cause execution of the set of program instructions within the first child environment in response to determining that the set of program instructions cannot be provided to the parent environment for execution within the second child environment.

15. The method of claim 13, further comprising:

selecting, by the web application, a particular one of a plurality of application program interfaces (APIs) for communicating with the parent environment, wherein the particular API is selected based on an operating system executing on the computer system.

16. The method of claim 13, wherein sending the request includes:

communicating, by the web application, with another application executing within the first child environment to transmit the set of program instructions from the web application to the parent environment via the other application.

* * * * *